Dec. 23, 1969     E. M. JOST     3,485,673
NICKEL-ZINC BATTERY SYSTEM HAVING AN AQUEOUS ELECTROLYTE
CONSISTING OF POTASSIUM HYDROXIDE AND
POTASSIUM CARBONATE
Filed Feb. 28, 1967

INVENTOR
ERNEST M. JOST

ATT'Y.
James P. McAndrews

United States Patent Office 3,485,673
Patented Dec. 23, 1969

3,485,673
NICKEL-ZINC BATTERY SYSTEM HAVING AN AQUEOUS ELECTROLYTE CONSISTING OF POTASSIUM HYDROXIDE AND POTASSIUM CARBONATE
Ernest M. Jost, Plainville, Mass., assignor to Texas Instruments Incorporated, Dallas, Tex., a corporation of Delaware
Filed Feb. 28, 1967, Ser. No. 619,365
Int. Cl. H01m 43/06
U.S. Cl. 136—28                7 Claims

ABSTRACT OF THE DISCLOSURE

A battery system is shown which incorporates nickel and zinc electrodes in an electrolyte comprising an aqueous solution of potassium hydroxide and potassium carbonate, the system having suitable low internal resistance and substantially improved useful life.

Background of the invention

In nickel-zinc battery systems using conventional aqueous solutions of potassium hydroxide as an electrolyte, the electrochemically active zinc material produced in the zinc electrode during discharge of the battery system is soluble in the electrolyte to a significant extent. Thus some of this active zinc material tends to enter the electrolyte while the battery system is being discharged and while the system stands in a discharged condition. Upon recharging of the battery system, these zinc species in the electrolyte return to the zinc electrode at random locations resulting in rapid dendritic growth and ultimate short-circuiting of the battery electrodes.

Summary of the invention

In accordance with this invention a battery system is provided with nickel and zinc electrodes and with an electrolyte comprising an aqueous solution of potassium hydroxide and potassium carbonate. The electrolyte in such a system has a suitably high conductivity to provide the system with suitably low internal resistance. In addition, the active zinc material formed on the zinc electrode during discharge of the battery system has a relatively low solubility in the battery electrolyte. As a result dendritic growth in the battery is substantially inhibited. In this way, the electrode of this invention achieves the object of substantially improved useful life, a factor which significantly affects its commercial attractiveness. Further, this longer useful battery life is achieved while the battery also achieves commercially desirable low internal resistance.

Description of prefrred embodiments

Figure 1:
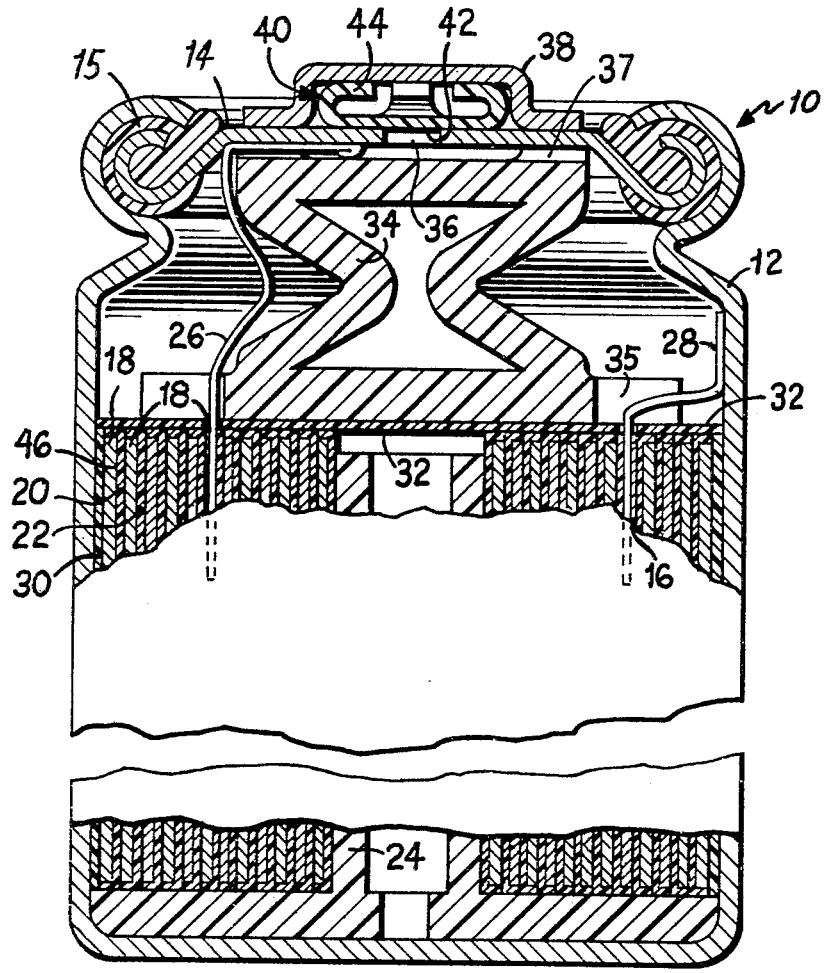
FIG. 1 is a section view along the vertical axis of the battery of this invention.
Figure 2:
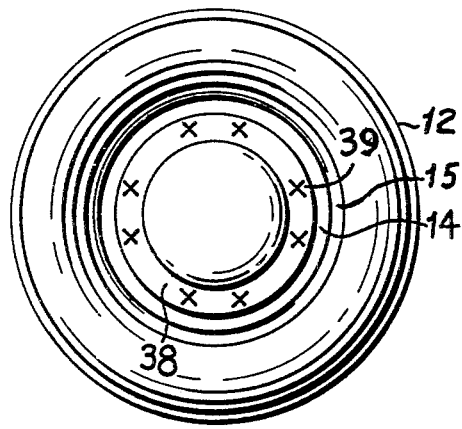

Referring to the drawing, 10 in FIG. 1 illustrates the novel and improved nickel-zinc battery system of this invention. As shown, the battery system includes a casing 12 formed for example of steel or nickel having a cover 14 sealed to and electrically insulated from the casing by a ring 15 of fused plastic such as polyethylene. Within the sealed casing, a conventional porous zinc electrode 16 embodying electro-chemically active zinc metal particles sintered or otherwise secured to an electrically conductive zinc-plated woven mesh screen and a conventional porous nickel electrode 18 embodying electrochemically active nickel material such as β-nickelic oxide secured to an electrically-conductive woven mesh nickel screen are interleaved with porous electrically-insulating separators 20 and 22, for example of a plastic or textile material such as a felt, and are wound in spiral form on a plastic mandrel 24 of polyethylene or the like so that the electrodes are disposed in closely spaced relation to each other. An electrically-conductive tab or lead 26 is welded to the nickel electrode and is welded or soldered to the cover 14 whereas a second electrically conductive tab or lead 28 is welded to the zinc electrode and is welded or soldered to the casing 12. An additional cylindrical electrical insulator sleeve 30 is fitted within the casing around the electrodes 16 and 18 and an insulator disc 32 is placed on top of the electrodes 16 and 18 as shown in FIG. 1, these insulators 30 and 32 preferably being formed of the same material as the separators 20 and 22. In addition, a spacer 34 is formed of a plastic material such as polyethylene is rested on top of the insulator disc 32 to bear against the disc and against the cover 14 for holding the electrode material in place in the casing 12. The spacer 34 is preferably provided with passages 35 permitting clearance for the electrode leads 26 and 28 and is provided with passages 37 permitting the passage of gas.

In the preferred embodiment of this invention, the cover 14 has a central aperture 36 and has a terminal cap 38 which fits over the aperture 36 and which is welded to the cover at spaced locations 39 so that the terminal cap is not sealed in liquid-tight relation to the cover. Between the terminal cap and the cover, a spider-shaped resilient member 40 of polyethylene or the like is disposed so that a valve portion 42 of the member 40 seats against the rim of cover aperture 36 to normally seal the aperture, the legs 44 bf the member 40 bearing against the terminal cap 38. In this arrangement, the member 40 normally seals the cover aperture 36 to prevent the escape of gasses and liquid from within the casing 12. However, the legs of the member 40 are adapted to flex when fluid pressure within the casing 12 exceeds a selected limit such as 100 pounds per square inch for permitting the valve portion 42 to move away from the cover aperture 36 and to permit the fluid to vent or escape through the spacer passages 37 and cover aperture 36 and to vent or escape from the battery 10 under the terminal cap 38.

In accordance with this invention, an electrolyte is disposed within the casing 12 so that the electrolyte thoroughly wets the electrodes 16 and 18 and is soaked up and drawn into the separators 20 and 22 to form electrolytic paths between the electrodes 16 and 18 as indicated at 46 in FIG. 1, the electrolyte preferably comprising an aqueous solution of potassium hydroxide and potassium carbonate. For example, the electrolyte preferably comprises a solution embodying a 3 M concentration of potassium hydroxide and a 3 M concentration of potassium carbonate.

The apparatus thus described comprises a nickel-zinc battery system in which, when the battery system is properly charged, the zinc electrode comprises the negative electrode of the system and is electrically connected to the casing 12 so that the casing serves as a negative terminal means for connecting the battery in an electrical circuit in conventional manner. The nickel electrode comprises the positive electrode in the battery system and is electrically connected to the cover 14 and the terminal cap 38, the terminal cap serving as positive terminal means for connecting the battery in an electrical circuit in conventional manner. As will be understood, when such a battery system is discharged, the zinc metal on the electrode 16 is converted to zinc hydroxide (also referred to as hydrated zinc oxide); on charging of the battery system, the zinc hydroxide on the electrode 16 is reconverted to zinc metal.

In this regard it is noted that in conventional battery systems employing electrolytes consisting of 7 M concentrations of potassium hydroxide in water, the zinc hydroxide formed on the electrode 16 during battery discharge has a significant solubility in the potassium hydroxide electrolyte. That is, the zinc hydroxide reacts with the electrolyte to form zincate ions [$Zn(OH)_3^-$]. It has been found for example that when the electrode 16 stands in a 7 M concentration of potassium hydroxide, the concentration of zincate ion will gradually increase to approximately 0.9 M in the electrolyte. Then upon recharging of the battery system, the zinc species in the electrolyte return to the electrode 16 at random locations tending to form dendrites on the electrode surface. It has been observed that these denrites grow quite rapidly and ultimately reach such a length that they contact the electrode 18 through the separators 20 or 22 resulting in internal short-circuiting of the battery system. Thus, although the 7 M potassium hydroxide electrolyte of the prior art has a relatively high conductivity in the order of 0.562 reciprocal ohms per centimeter (0.562 mho), a nickel-zinc battery system incorporating such an electrolyte is characterized by rapid dendrite growth on the zinc electrode and by a relatively short useful life, sometimes limited to only a few charge and discharge cycles thus rendering the system commercially unusable.

In the battery system of this invention, the electrolyte comprising about a 3 M concentration of potassium hydroxide and about a 3 M concentration of potassium carbonate in water, is also characterized by suitably high conductivity on the order of 0.345 reciprocal ohms per centimeter so that the battery system 10 has a suitably low and commercially desirable internal resistance. It has been discovered that while the electrolyte retains a high conductivity, the zinc hydroxide formed at the electrode 16 during discharge of the battery 10 is substantially insoluble in the electrolyte 46. That is, when the electrode 16 is permitted to stand in discharged condition in the electrolyte 46, the concentration of zincate ion in the electrolyte does not increase beyond about 0.01 M concentration, a solubility approximately 90 times less (or almost 2 orders of magnitude) than the solubility of the same zinc species in the conventional prior art electrolyte. This significantly lower solubility in the electrolyte according to this invention results in providing battery system in which dendritic growth is substantially reduced or minimized to a very slow dendrite growth. As a result, the battery system 10 of this invention is characterized by potential, energy capacity and internal resistance properties comparable to conventional nickel-zinc battery systems but displays a significantly longer useful life by avoiding dendrite formation.

Although the electrolyte contemplated by this invention preferably embodies 3 M concentrations of potassium hydroxide and potassium carbonate, it should be understood that beneficial results are also obtained by use of this combination of electrolyte constituents in different concentrations within the scope of the invention. That is, although particular embodiments of the electrolyte 46 have been described by way of illustration, this invention includes all modifications and equivalents thereof which fall within the scope of the appended claims.

I claim:
1. A battery system comprising a positive electrode consisting of electrochemically active nickel material, a negative-electrode consisting of electrochemically active zinc material, and an electrolyte consisting of an aqueous solution of potassium hydroxide and potassium carbonate.
2. A battery system as set forth in claim 1 wherein said electrolyte consists of a 3 M concentration of said potassium hydroxide and a 3 M concentration of said potassium carbonate.
3. A battery system as set forth in claim 2 wherein said positive electrode consists of electrochemically active nickel material secured to an electrically conductive substrate, said negative electrode consists of electrochemically active zinc material secured to an electrically conductive substrate, said electrodes and electrolyte being sealed within a casing, said electrodes having respective terminal means electrically connected to said electrodes and electrically insulated from each other.
4. A battery system as set forth in claim 3 having vent means permitting escape of fluid pressure in excess of a selected pressure from within said casing.
5. An electrolyte for use in a nickel-zinc battery system consisting of an aqueous solution of potassium hydroxide and potassium carbonate.
6. An electrolyte as set forth in claim 5 wherein said electrolyte consists of a 3 M concentration of said potassium hydroxide and a 3 M concentration of said potassium carbonate.
7. A battery system comprising a sealed casing, a positive electrode consisting of electrochemically active nickel material, a negative electrode consisting of electrochemically active zinc material, said electrodes being disposed in said casing in closely spaced relation to each other, porous separator means disposed between said electrodes for electrically insulating said electrodes from each other, an electrolyte consisting of an aqueous solution of potassium hydroxide and potassium carbonate disposed in said casing to form electrolytic paths between said electrodes and terminal means for said respective electrodes accessible from outside said casing.

References Cited

UNITED STATES PATENTS

| | | | |
|---|---|---|---|
| 703,875 | 7/1902 | Winship | 136—76 XR |
| 714,201 | 11/1902 | Laszcynski | 136—28 |
| 976,277 | 11/1910 | Morrison | 136—154 |
| 3,053,924 | 9/1962 | Strauss | 136—30 |
| 3,342,639 | 9/1967 | Harivel | 136—28 XR |

WINSTON A. DOUGLAS, Primary Examiner

A. SKAPARS, Assistant Examiner

U.S. Cl. X.R.

136—30, 102, 154